(12) United States Patent
McConnell et al.

(10) Patent No.: US 10,645,047 B2
(45) Date of Patent: *May 5, 2020

(54) GENERATING A CHRONOLOGICAL REPRESENTATION OF SOCIAL NETWORK COMMUNICATIONS FROM SOCIAL NETWORK FEEDS BASED UPON ASSIGNED PRIORITIES

(71) Applicant: salesforce.com, inc., San Francisco, CA (US)

(72) Inventors: Jager McConnell, San Francisco, CA (US); Ciara Peter, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 619 days.

This patent is subject to a terminal disclaimer.

(21) Appl. No.: 14/715,261

(22) Filed: May 18, 2015

(65) Prior Publication Data

US 2015/0312191 A1   Oct. 29, 2015

Related U.S. Application Data

(63) Continuation of application No. 13/525,741, filed on Jun. 18, 2012, now Pat. No. 9,037,681.

(60) Provisional application No. 61/507,038, filed on Jul. 12, 2011.

(51) Int. Cl.
  *H04L 12/58*   (2006.01)
(52) U.S. Cl.
  CPC .............. *H04L 51/16* (2013.01); *H04L 51/20* (2013.01)

(58) Field of Classification Search
  CPC ....... G06F 17/30064; G06F 2209/5021; H04L 51/16; H04L 51/20; H04L 51/26; G06Q 50/01
  See application file for complete search history.

(56) References Cited

U.S. PATENT DOCUMENTS 5,388,197 A * 2/1995 Rayner ................ G11B 27/034
                                                345/660
5,577,188 A   11/1996 Zhu
5,608,872 A   3/1997 Schwartz
(Continued)

*Primary Examiner* — Lance Leonard Barry
(74) *Attorney, Agent, or Firm* — Dergosits & Noah LLP; Todd A. Noah

(57) ABSTRACT

Systems and methods are provided for managing timelines of social network communications from social network feeds. A system accesses social network communications associated with a user of at least one social network and identifies a plurality of social network communications based on each respective communication being related to a same associated attribute. The system assigns a priority to each identified social network communication based on a corresponding number of social network references generated by social network account contacts and selects a first identified communication from a first social network based on its assigned priority and a second identified communication from a different social network based on its assigned priority. The system generates a visual representation of the first and second identified social network communications and outputs a chronological representation of the identified social network communications, including the visual representation of the first and the second identified social network communications.

21 Claims, 6 Drawing Sheets

(56) References Cited

U.S. PATENT DOCUMENTS

| | | |
|---|---|---|
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,600,501 B1 * | 7/2003 | Israel ............... G06Q 10/109 |
| | | 708/112 |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,947 B1 * | 12/2011 | Yeh ...................... G06F 16/951 |
| | | 709/224 |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,145,678 B2 * | 3/2012 | Ramsay, Jr. ........... G06Q 10/10 |
| | | 707/802 |
| 8,209,308 B2 | 6/2012 | Jakobson et al. |
| 8,230,333 B2 * | 7/2012 | Decherd ............ G06F 16/9537 |
| | | 715/243 |
| 8,255,521 B1 * | 8/2012 | Natarajan ............ H04L 67/306 |
| | | 709/224 |
| 8,275,836 B2 | 9/2012 | Beaven et al. |
| 8,356,248 B1 * | 1/2013 | Killalea ............ G06Q 30/0601 |
| | | 707/751 |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,128,981 B1 * | 9/2015 | Geer ..................... G06F 16/444 |
| 2001/0044791 A1 | 11/2001 | Richter et al. |
| 2002/0072951 A1 | 6/2002 | Lee et al. |
| 2002/0077863 A1 * | 6/2002 | Rutledge ................ G16H 10/60 |
| | | 705/3 |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0203838 A1 * | 9/2005 | Zhang ..................... G06Q 20/10 |
| | | 705/39 |
| 2006/0053034 A1 * | 3/2006 | Hlatshein ................ G06Q 50/22 |
| | | 705/2 |
| 2008/0056071 A1 * | 3/2008 | Burtner ................ G06Q 10/10 |
| | | 368/28 |
| 2008/0132252 A1 * | 6/2008 | Altman ............... G06Q 30/0207 |
| | | 455/457 |
| 2008/0294663 A1 * | 11/2008 | Heinley ................ G06F 3/0481 |
| 2009/0063415 A1 | 3/2009 | Chatfield et al. |
| 2009/0100342 A1 | 4/2009 | Rueben et al. |
| 2009/0172511 A1 * | 7/2009 | Decherd ............ G06F 16/9537 |
| | | 715/207 |

(56) References Cited

U.S. PATENT DOCUMENTS

| | | |
|---|---|---|
| 2009/0177744 A1 | 7/2009 | Marlow et al. |
| 2009/0216775 A1* | 8/2009 | Ratliff ................... H04W 4/029 |
| 2009/0319484 A1* | 12/2009 | Golbandi .............. G06F 16/951 |
| 2011/0021250 A1* | 1/2011 | Ickman ............. G06F 17/30867 |
| | | 455/566 |
| 2011/0113057 A1* | 5/2011 | Lee ........................ G06Q 10/10 |
| | | 707/769 |
| 2011/0125844 A1* | 5/2011 | Collier ................... H04L 67/12 |
| | | 709/204 |
| 2011/0202866 A1* | 8/2011 | Huang .................. G06F 3/0482 |
| | | 715/779 |
| 2011/0238485 A1* | 9/2011 | Haumont ............... G06Q 30/02 |
| | | 705/14.41 |
| 2012/0166432 A1* | 6/2012 | Tseng ................. G06Q 30/0261 |
| | | 707/728 |
| 2012/0209850 A1* | 8/2012 | Kikin-Gil ............. G06F 16/338 |
| | | 707/738 |
| 2012/0233137 A1 | 9/2012 | Jakobson et al. |
| 2012/0236201 A1* | 9/2012 | Larsen ................... G06Q 10/10 |
| | | 348/468 |
| 2012/0323933 A1* | 12/2012 | He ....................... G06Q 10/107 |
| | | 707/749 |
| 2013/0018956 A1* | 1/2013 | McConnell ............ G06Q 50/01 |
| | | 709/204 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |

\* cited by examiner

300

Stanford Grad School 216

Winter 2008

 John Smith – It's official – got into Stanford grad school next fall!

 John Smith – planning a trip to Palo Alto, CA 4/8/09 to 4/15/09

 John Smith checked in at U.S.C. (10%) 302

Spring 2009

 John Smith uploaded 9 photos to the set Palo Alto

 John Smith created the album Going away party (70%) 304

Fall 2009

 John Smith ousted Jane Doe as mayor of Archstone Palo Alto

 John Smith –Thanks for all the birthday wishes! (30%) 306

FIG. 3

GENERATING A CHRONOLOGICAL REPRESENTATION OF SOCIAL NETWORK COMMUNICATIONS FROM SOCIAL NETWORK FEEDS BASED UPON ASSIGNED PRIORITIES

CLAIM OF PRIORITY

This application is a continuation of U.S. application Ser. No. 13/525,741 filed Jun. 18, 2012 now U.S. Pat. No. 9,037,681, which claims the benefit of U.S. Provisional Patent Application 61/507,038 filed Jul. 12, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MANAGING TIMELINES OF NETWORK FEEDS

One or more implementations relate generally to managing multiple timelines of network feeds.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A social networking service is an online service, platform, or site that focuses on facilitating the building of social networks or social relations among people who may share interests, activities, real-life connections, or backgrounds. A social network service consists of a representation or profile for each user, his/her social links, and a variety of additional services. Most social network services are web-based and provide means for users to interact over the Internet, such as e-mail and instant messaging. Social networking sites allow users to share ideas, activities, events, and interests within their individual networks. Popular social networking services include Facebook™, Google+™, Twitter™, LinkedIn™, YouTube™, Foursquare™, Yelp™, Expedia™, MySpace™, and Flickr™. An individual may use many social networking sites, each which enable the individual to interact with other users via countless social network communications, or network feeds.

BRIEF SUMMARY

In accordance with embodiments, there are provided systems and methods for managing multiple timelines of network feeds. A timeline is typically a graphic depicting a bar labeled with dates corresponding to a chronological list of events, such as network feeds, labeled at points on the bar where the events would have happened. The systems and methods access network feeds associated with at least one social network. For example, a system user enables the system to access all of the system user's Google+™ and Twitter™ network feeds. The system identifies sets of network feeds based on associated names, keywords, calendar dates, and/or geographic locations from the combination of the system user's social network feeds. For example, the system identifies a set of network feeds associated with each of the system user's wedding, the system user's baby Jake, and the universities where the system user studied. The system outputs timelines of the sets of network feeds, based on calendar dates associated with the sets of network feeds, to a display device. For example, the system outputs multiple timelines, one for each of the system user's wedding, the system user's baby Jake, and the universities where the system user studied, with each timeline including links to the timeline's set of network feeds. The system can supplement the timelines of network feeds with additional network feeds associated with other network users. For example, the system supplements the wedding timeline with photos from the system user's Google+™ contacts and supplements the baby Jake timeline with network feeds from the system user's Twitter™ contacts. Accordingly, systems and methods are provided that enable a database system to monitor network feeds to improve the management of multiple timelines, thereby providing a system user with a timeline summary for the system user's life based on network feeds from the system user's social networks.

While one or more implementations and techniques are described with reference to an embodiment in which managing multiple timelines of network feeds is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 is another screen shot illustrating another frame of another example user interface screen of a display device supporting methods for managing multiple timelines of network feeds;

DETAILED DESCRIPTION

General Overview

Systems and methods are provided for managing multiple timelines of network feeds.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for managing multiple timelines of network feeds will be described with reference to example embodiments.

The following detailed description will first describe a method for accessing network feeds from social networks; identifying sets of network feeds based on names, keywords, dates, and locations; and outputting timelines of the sets of network feeds.

Next, screen shots illustrating frames of example user interface screens are described.

Figure 1:
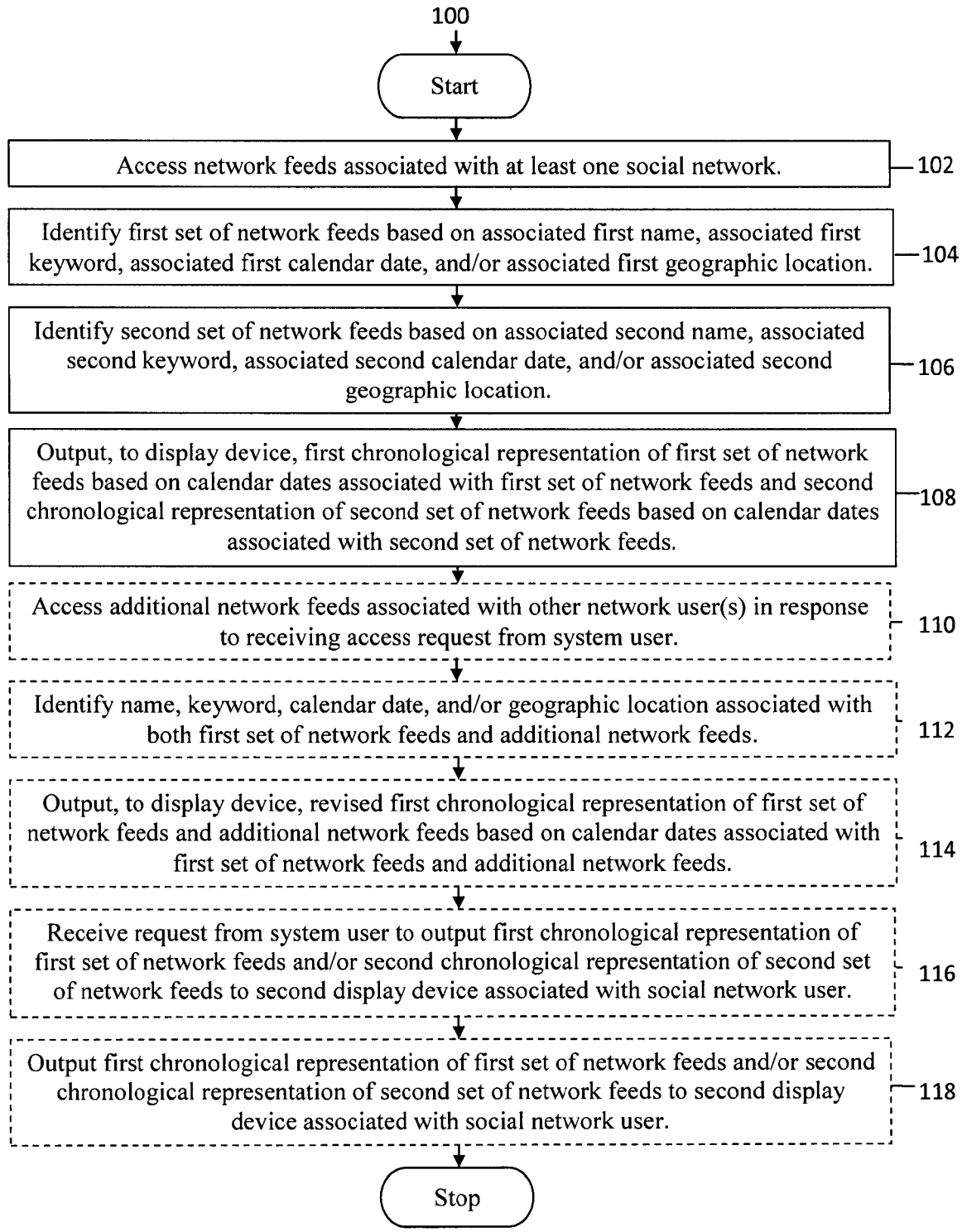
FIG. 1 is an operational flow diagram illustrating a high level overview of a method for managing multiple timelines of network feeds in an embodiment.

FIG. 1 is an operational flow diagram illustrating a high level overview of a method 100 for managing multiple timelines of network feeds in an embodiment. As shown in FIG. 1, a database system can enable a system user to identify and view sets of network feeds from social networks based on names, keywords, dates, and locations, thereby providing the system user with a timeline summary for the system user's life based on network feeds from the system user's social networks.

In block 102, network feeds associated with at least one social network are accessed. For example and without limitation, this can include the database system accessing a system user's Facebook™, Google+™, Twitter™, LinkedIn™, YouTube™, Foursquare™, Yelp™, Expedia™, MySpace™, and Flickr™ network feeds. Accessing the system user's network feeds across social networks may result in archiving network feeds from a specific social network for current and future timeline usage when the future existence of the specific social network may be difficult to predict. By accessing the system user's network feeds across social networks, the database system may provide the system user with timelines that assist the system user in recalling fond but forgotten memories, such as what music the system user listened to during high school and where the system user went for spring break during university studies.

In block 104, a first set of network feeds are identified based on an associated first name, an associated first keyword, an associated first calendar date, and/or an associated first geographic location. By way of example and without limitation, this can include the database system identifying a set of network feeds associated with the system user's wedding based on the keyword wedding, the date of the wedding, and the location of the wedding from the combination of the system user's social network feeds. Other examples of timeline grouping may include employment history, work products, and professional certifications. The database system may use start and stop dates from social networks such as LinkedIn™ to identify sets of network feeds for timelines.

In block 106, a second set of network feeds are identified based on an associated second name, an associated second keyword, an associated second calendar date, and/or an associated second geographic location. In embodiments, this can include the database system identifying a set of network feeds associated with the system user's baby Jake based on the name Jake, the keyword baby, the date of baby Jake's birth, and the location of baby Jake's birth.

In block 108, a first chronological representation of a first set of network feeds based on calendar dates associated with the first set of network feeds and a second chronological representation of a second set of network feeds based on calendar dates associated with the second set of network feeds are output to a display device. For example and without limitation, this can include the database system outputting multiple timelines, one for each of the system user's wedding, the system user's baby Jake, and the universities where the system user studied, with each timeline including links to the timeline's set of network feeds. Examples of additional timelines are described below in reference to FIG. 2. The display device may be a handheld computing device, a mobile phone, a laptop computer, a work station, and/or a similar communication device.

The sets of network feeds may include a visual representation of some of a set's network feeds. For example, the wedding timeline includes photos of the wedding and visual representations of the network feeds associated with the wedding, while the baby Jake timeline includes photos of baby Jake and visual representations of the network feeds associated with the birth of baby Jake. Examples of additional timelines and visual representations are described below in reference to FIG. 2.

The database system may assign a priority to each of the network feeds, wherein each of the network feeds is displayed by the display device based on an associated priority. For example, the database system may assign a high priority to the two wedding photos referenced most often in the wedding timeline, such that the display device displays the two most referenced wedding photos, instead of all the wedding photos, for the wedding timeline.

The database system may output information about at least one of the network feeds in response to receiving a selection of a selectable link associated with the chronological representation of the network feeds. For example, the database system may output a list of all of the wedding timeline's network feeds, instead of only the wedding timeline's two most popular network feeds, in response to receiving a selection of the wedding timeline by the system user. In another example, the database system may output all of the details for a specific network feed for the wedding, instead of the list of all of the wedding timeline's network feeds, in response to receiving a selection of the specific network feed by the system user.

The first set of network feeds may include at least one of the second set of network feeds. For example, the set of network feeds for a University of Southern California timeline may include a network feed that is also part of a Stanford Graduate School timeline, such as a network feed posted by the system user while attending the University of Southern California about acceptance to study at the Stanford Graduate School.

The chronological representations of the network feeds may be displayed by the display device on a map based on associated geographical locations. For example, the display device may display the University of Southern California timeline on the portion of a map that depicts Southern California and simultaneously display the Stanford Graduate School timeline on the portion of the map that depicts Northern California, an example of which is depicted in FIG. 2A.

The chronological representations of the network feeds may be displayed by the display device in a vertical orientation. Displaying a vertical orientation of a timeline may assist the system user in reviewing and editing the network feeds listed for the timeline. An example of a vertical depiction of the Stanford Graduate School timeline is described below in reference to FIG. 3.

Each of the network feeds may be displayed by the display device with an associated grouping confidence level. Displaying grouping confidence levels for each network feed in a timeline may assist the system user in reviewing and deleting the network feeds listed for the timeline. An example of grouping confidence levels for the network feeds of the Stanford Graduate School timeline are described below in reference to FIG. 3.

The database system may delete one of the network feeds from a set of network feeds in response to receiving a system user request. For example, the system user may review a 70% grouping confidence level that the database system assigned to a specific network feed in the Stanford Graduate School timeline, and instruct the database system to delete the specific network feed from the Stanford Graduate School timeline.

The database system may add one of the network feeds to a set of network feeds in response to receiving a system user request. For example, the system user may review a 70% grouping confidence level that the database system assigned to a specific network feed in the Stanford Graduate School timeline, and instruct the database system to add the specific network feed to the University of Southern California timeline.

The database system may output at least some of the network feeds and any additional network feeds in response to search criteria received from the system user via the display device. For example, the database system outputs network feeds that convey birthday references from multiple timelines in response to the system user entering "birthday" as search criteria. In another example, the system user may search for "Costa Rica" to identify a specific timeline based on a lengthy visit to Costa Rica or to identify multiple trips to Costa Rica from network feeds from multiple timelines.

In block 110, additional network feeds associated with other network user(s) are optionally accessed in response to receiving an access request from a system user. By way of example and without limitation, this can include the database system accessing network feeds from the system user's Google+™ contacts and the system user's Twitter™ contacts. The database system may also access network feeds associated with public network users. For example, the system user may be dissatisfied with the system user's photos of a specific Fourth of July fireworks display taken while the system user studied at Stanford's Graduate School, and the system user also dissatisfied with the photos of the same Fourth of July fireworks display taken by the system user's social network contacts. Therefore, the system user may instruct the database system to access network feeds to identify photos from public network users who were at the same location as the system user for the Fourth of July fireworks display.

In block 112, a name, a keyword, a calendar date, and/or a geographic location associated with both a first set of network feeds and additional network feeds are optionally identified. In embodiments, this can include the database system identifying a set of network feeds from the system user and additional network feeds from the system user's social network contacts that are associated with the system user's wedding based on the keyword wedding, the date of the wedding, and the location of the wedding.

In block 114, a revised first chronological representation of a first set of network feeds and additional network feeds based on calendar dates associated with the first set of network feeds and additional network feeds is optionally output to a display device. For example and without limitation, this can include the database system outputting a revised timeline for the system user's wedding, where the revised timeline includes not only photos from the system user's network feeds, but also photos from the system user's social network contacts.

The database system may output the chronological representations of the network feeds and the additional network feeds to the display device associated with a social network user based on applying privacy settings selected by the system user to the chronological representations of the network feeds. For example, the system user may want to limit the ability to view photographs of a bachelor party when sharing a wedding timeline with coworkers who attended the system user's wedding and contributed their photos of the system user's wedding to the wedding timeline.

In block 116, a request from a system user to output a first chronological representation of a first set of network feeds and/or a second chronological representation of a second set of network feeds to a second display device associated with another social network user is optionally received. By way of example and without limitation, this can include the database system receiving a request from the system user to output the wedding timeline of network feeds and the baby Jake timeline of network feeds to the laptop used by the system user's parents.

In block 118, a first chronological representation of a first set of network feeds and/or a second chronological representation of a second set of network feeds is optionally output to a second display device associated with another social network user. In embodiments, this can include the database system outputting the wedding timeline of network feeds and the baby Jake timeline of network feeds to the laptop used by the system user's parents. In another example, the database system may output network feeds, such as restaurant reviews submitted by the system user's social network contacts and by the general public, to a widget embossed in a webpage that advertises the system user's restaurant. The system user may have the option to approve the network feeds before any new network feeds are posted to the widget to insure that a network feed from an angry member of the general public does not appear on the system user's webpage.

The database system may assign system administrator rights for chronological representations of the network feeds to another display device associated with another social network user in response to receiving an assignment request from the system user. For example, when baby Jake becomes old enough to manage his own timelines, Jake's parents can assign system administrator rights for the baby Jake timeline to Jake himself, such that Jake can delete any potentially embarrassing photos before sharing the baby Jake timeline with his girlfriend.

The method 100 may be repeated as desired. Although this disclosure describes the blocks 102-118 executing in a particular order, the blocks 102-118 may be executed in a different order.

Figure 2:
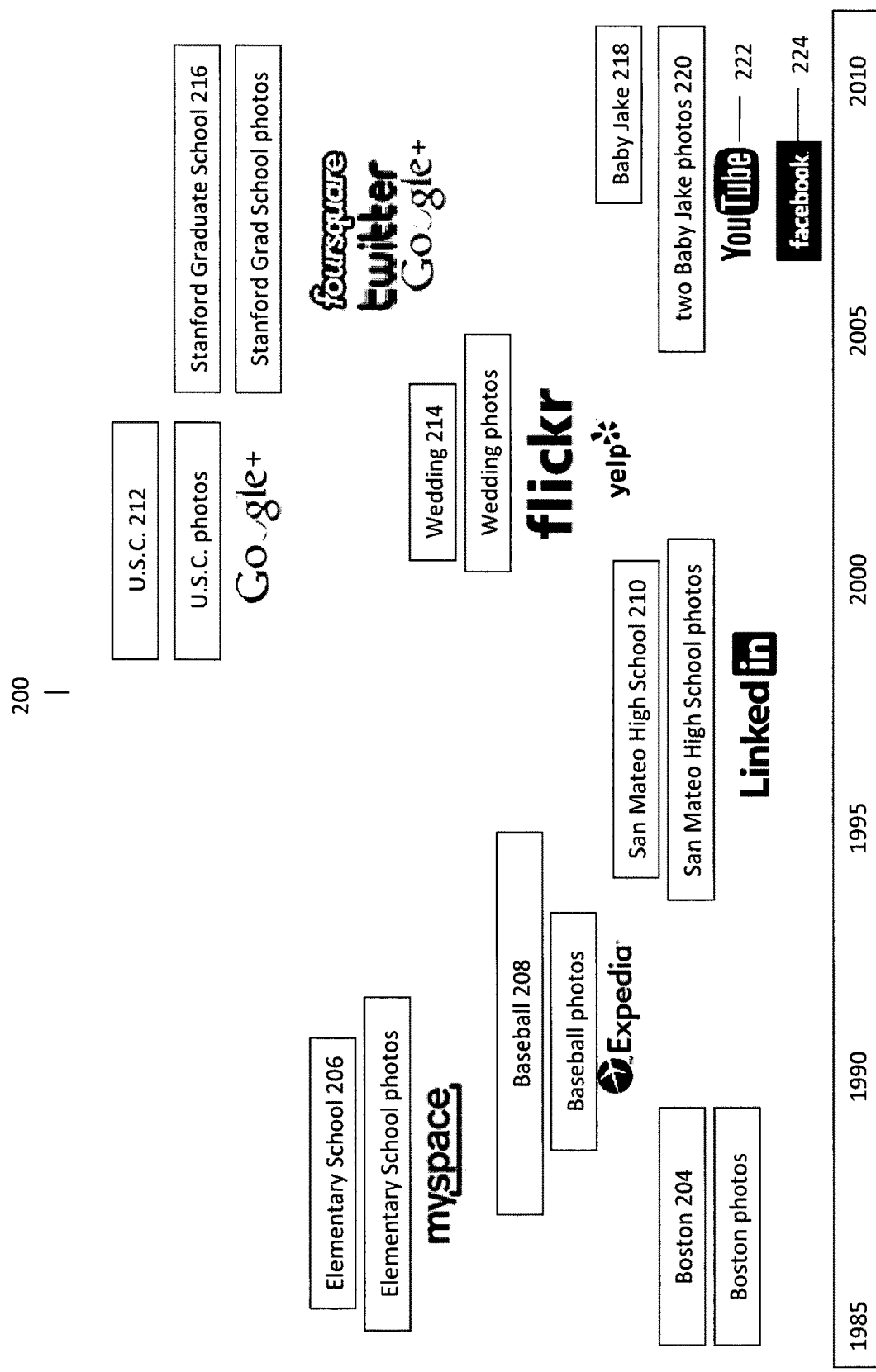
FIGS. 2 and 2A are screen shots illustrating a frame of an example user interface screen of a display device supporting methods for managing multiple timelines of network feeds.
Figure 2A:
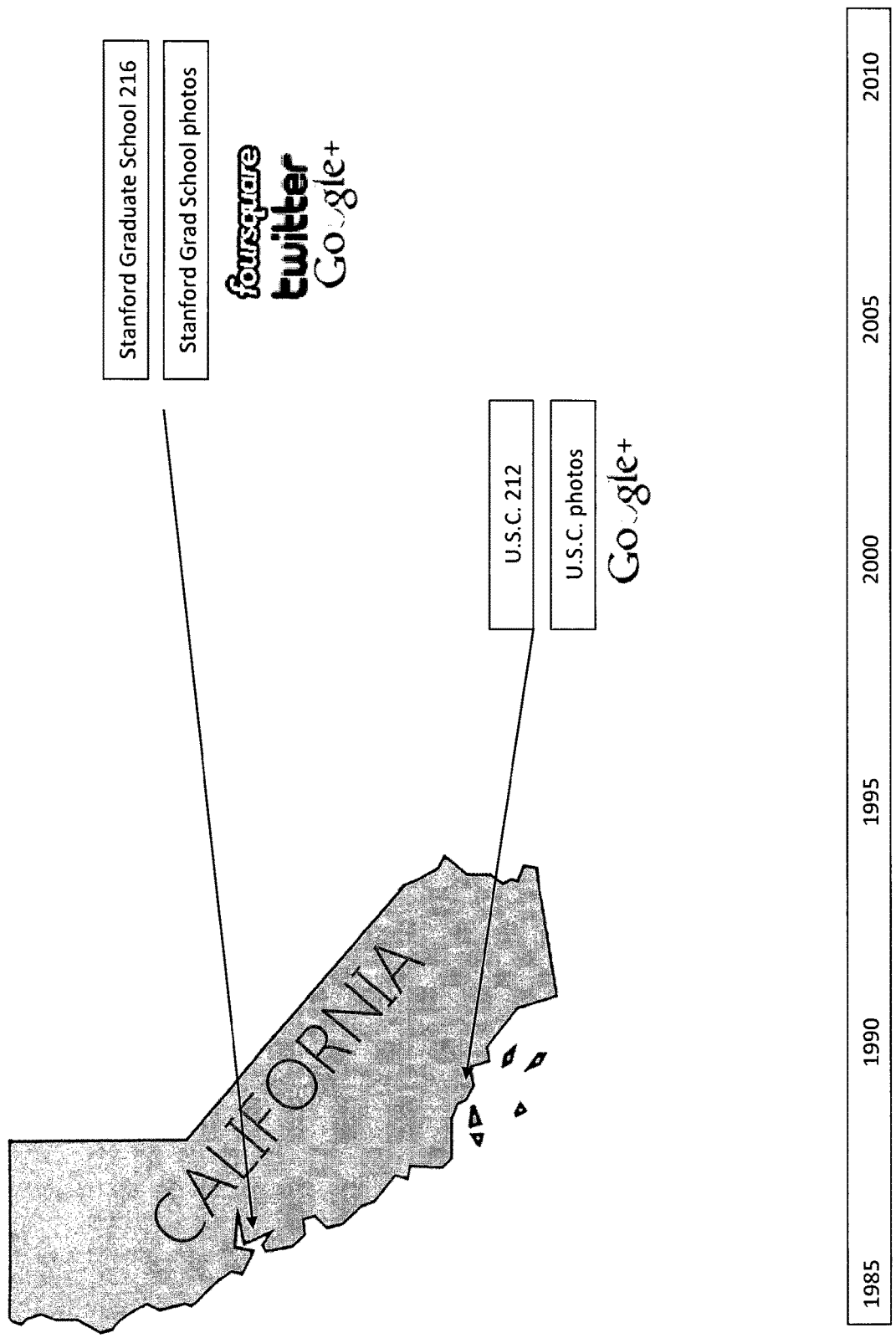

FIG. 2 is a screen shot illustrating a frame 200 of an example user interface screen of a display device supporting methods for managing multiple timelines of network feeds. The frame 200 may include a timeline chronology bar 202, a Boston 204 timeline, an Elementary School 206 timeline, a Baseball 208 timeline, a San Mateo High School 210 timeline, a University of Southern California ("U.S.C.") 212 timeline, a Wedding 214 timeline, a Stanford Graduate School 216 timeline, and a Baby Jake 218 timeline. Each of the timelines 204-218 is associated with multiple network feeds, and each timeline of network feeds may be from one of more social networks. The timelines 204-218 indicate the date ranges of their associated network feeds by aligning with a beginning date that is associated with the timeline's earliest network feed and aligning with an ending date that is associated with the timeline's latest network feed.

Each of the timelines 204-218 may depict associated photos. For example, the Baby Jake 218 timeline is close to two Baby Jake photos 220. In this example, the database system may assign a high priority to the two Baby Jake photos 220 referenced most often in the Baby Jake timeline 218, such that the display device displays the two most referenced Baby Jake photos 220, instead of all the Baby Jake photos available for the Baby Jake timeline 216. Further to this example, the display device may display the most referenced Baby Jake photo in a larger size than the second most referenced Baby Jake photo.

Each of the timelines 204-218 may depict associated network feeds other than the associated photos. For example, the Baby Jake 218 timeline is close to a YouTube™ network feed 222 and a Facebook™ network feed 224. Although FIG. 2 depicts the YouTube™ network feed 222 and the Facebook™ network feed 224 as only icons, the display device may also depict additional identifying information, such as "Video of Baby Jake's first steps," and "Update Status announcing Baby Jake's birth."

FIG. 3 is another screen shot illustrating a frame 300 of another example user interface screen of a display device supporting methods for managing multiple timelines of network feeds. The frame 300 may display a portion of the vertical depiction of the Stanford Graduate School timeline 216. The database system may use an algorithm for grouping countless network feeds from multiple social networks into the Stanford Graduate School 216 timeline based on names, keywords, dates, and locations, and assign an associated grouping confidence level to each of these network feeds. However, since the database system cannot be certain that the system user will agree that each network feed identified for the Stanford Graduate School 216 timeline actually belongs in the Stanford Graduate School 216 timeline, the display device may display the associated grouping confidence level for each of the network feeds for which the algorithm has a specified confidence level. For example, the display devices depicts that the Foursquare™ network feed 302 has an assigned confidence level of 10%, the Facebook™ network feed 304 has an assigned confidence level of 70%, and the Google+™ network feed 306 has an assigned confidence level of 30%. Further to this example, the system user may review the 70% grouping confidence level that the database system assigned to the Facebook™ network feed 304 in the Stanford Graduate School 216 timeline. After review, the system user may instruct the database system to delete the Facebook™ network feed 304 in the Stanford Graduate School 216 timeline because the going away party referenced by the Facebook™ network feed 304 was held at the University of Southern California, and was only suggested for the Stanford Graduate School 216 timeline because of some messages that friends posted about success at Stanford. Conversely, the system user may instruct the database system to add the Facebook™ network feed 304 in the U.S.C. 212 timeline, in addition to being depicted in the Stanford Graduate School 216 timeline, if the algorithm did not already assign the Facebook™ network feed 304 to the U.S.C. 212 timeline.

The frames 200-300 may be part of a larger display screen that includes fields for users to enter commands to create, retrieve, edit, and store records. The database system may output a display screen that includes the frames 200-300 in response to a search based on search criteria input via a user interface.

Because the frames 200-300 are samples, the frames 200-300 could vary greatly in appearance. For example, the relative sizes and positioning of the text is not important to the practice of the present disclosure. The frames 200-300 can be depicted by any visual display, but are preferably depicted by a computer screen. The frames 200-300 could also be output as a report and printed or saved in electronic format, such as PDF. The frames 200-300 can be part of a personal computer system and/or a network, and operated from system data received by the network, and/or on the Internet. The frames 200-300 may be navigable by a user. Typically, a system user can employ a touch screen input or a mouse input device to point-and-click to a location on the frames 200-300 to manage the text on the frame 200-300, such as a selection that enables a user to edit the text. Alternately, a system user can employ directional indicators, or other input devices such as a keyboard. The text depicted by the frames 200-300 are examples, as the frames 200-300 may include a much greater amount of text. The frames 200-300 may also include fields in which a user can input textual information.

System Overview

Figure 4:
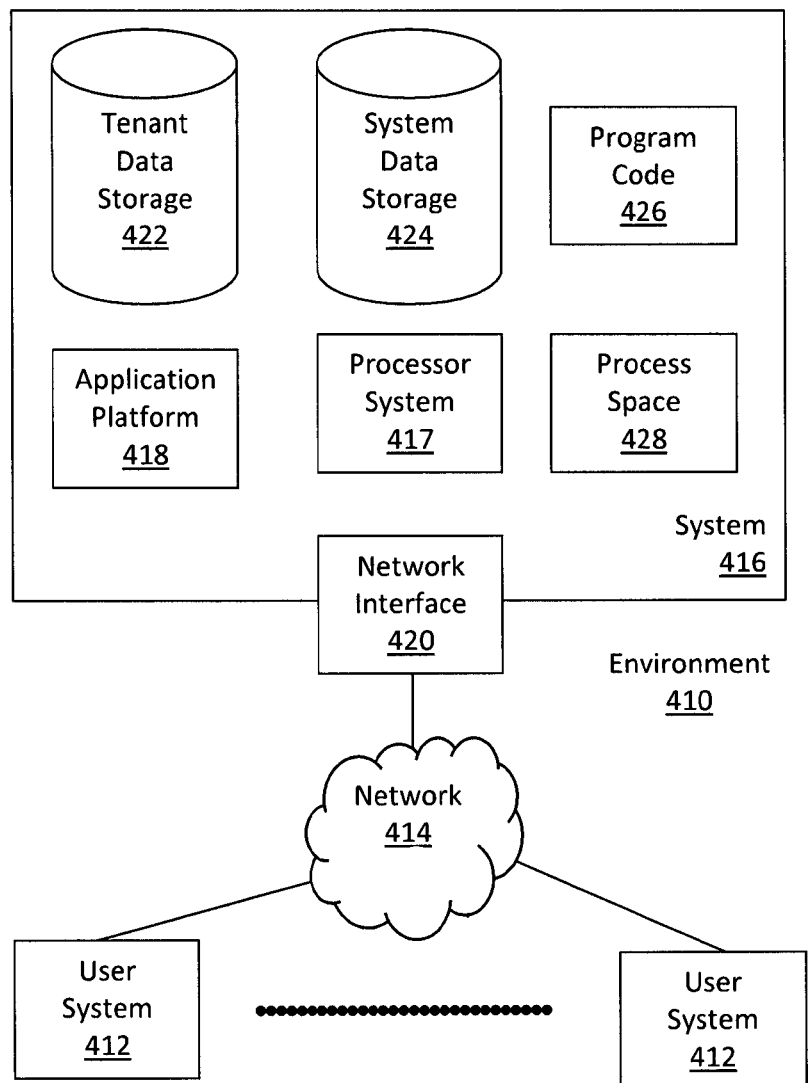
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414.

Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
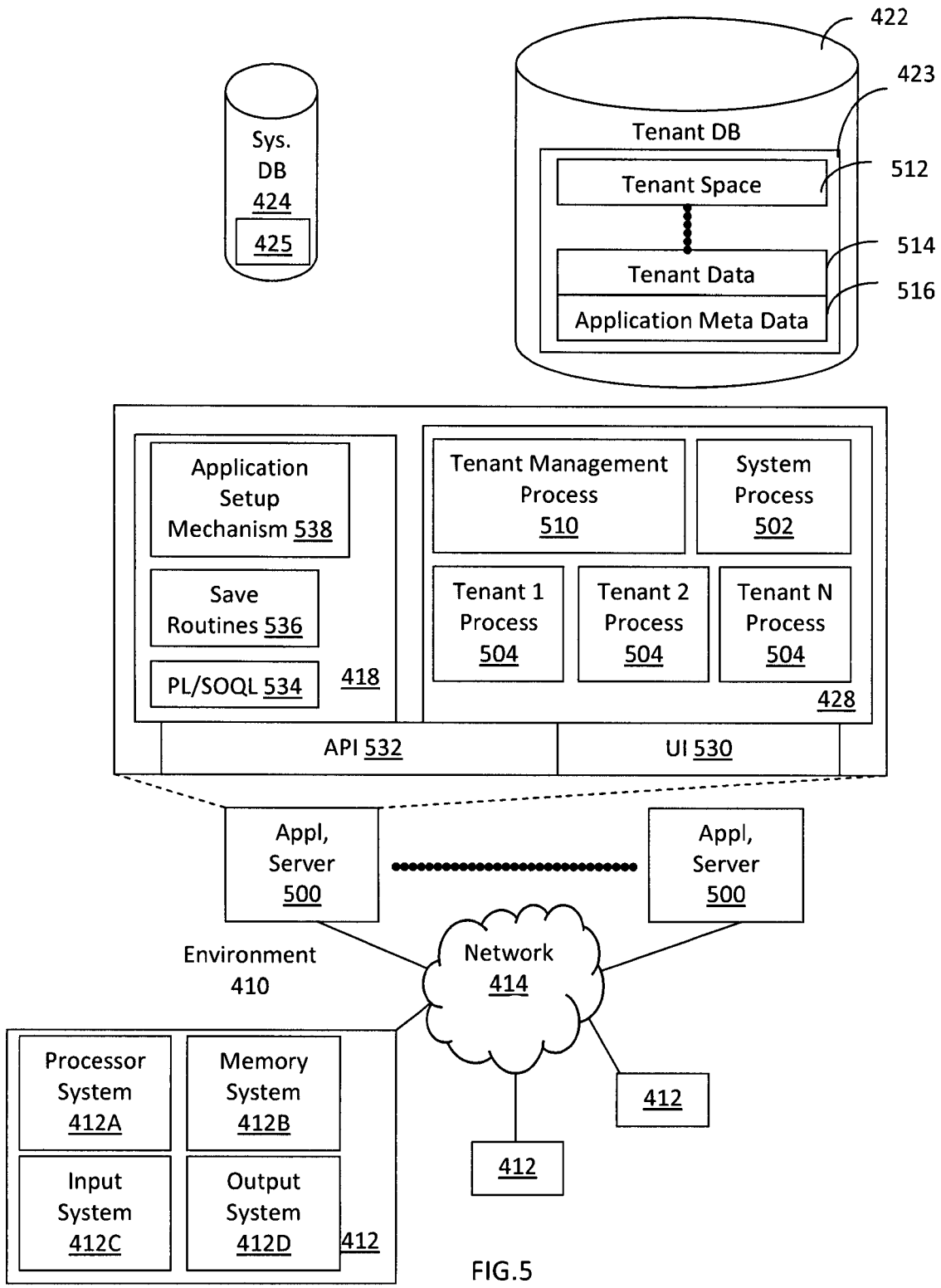
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks.

As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 34 that provides a programming language style interface extension to API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for managing a timeline of social network communications, the apparatus comprising:
a processor; and
one or more stored sequences of instructions which, when executed by the processor, cause the processor to carry out the steps of:
accessing social network communications associated with a user of at least one social network;
identifying a plurality of social network communications based on each respective social network communication being related to a same associated attribute, the associated attribute including at least one of a name, a keyword, a calendar date, or a geographic location;
assigning a priority to each identified social network communication based on a corresponding number of social network references generated by social network account contacts; selecting a first identified communication from a first social network based on its assigned priority and a second identified communication from a second different social network based on its assigned priority;
generating a visual representation of the first and the second identified social network communications; and
causing a chronological representation of the identified social network communications to be outputted to a display device, the chronological representation including the visual representation of the first and the second identified social network communications.

2. The apparatus of claim 1, wherein the chronological representation is displayed by the display device on a map based on associated geographical locations.

3. The apparatus of claim 1, wherein the chronological representation is displayed by the display device in a vertical orientation.

4. The apparatus of claim 1, wherein the plurality of social network communications is displayed by the display device with an associated grouping confidence level.

5. The apparatus of claim 1, further comprising deleting one of the identified social network communications from the plurality of social network communications in response to receiving a delete request.

6. The apparatus of claim 1, further comprising outputting, to the display device, information about at least one identified respective social network communication from the plurality of social network communications in response to receiving a selection of a selectable link associated with the chronological representation.

7. The apparatus of claim 1, wherein at least one social network in the plurality of different social networks is at least one of: Facebook™, Google+™, Twitter™, LinkedIn™, YouTube™, Foursquare™, Yelp™, Expedia™, MySpace™, and Flickr™.

8. A method for managing a timeline of social network communications, the method comprising:
accessing social network communications associated with a user of at least one social network;
identifying a plurality of social network communications based on each respective social network communication being related to a same associated attribute, the associated attribute including at least one of a name, a keyword, a calendar date, or a geographic location;
assigning a priority to each identified social network communication based on a corresponding number of social network references generated by social network account contacts; selecting a first identified communication from a first social network based on its assigned priority and a second identified communication from a second different social network based on its assigned priority;
generating a visual representation of the first and the second identified social network communications; and
causing a chronological representation of the identified social network communications to be outputted to a display device, the chronological representation including the visual representation of the first and the second identified social network communications.

9. The method of claim 8, wherein the chronological representation is displayed by the display device on a map based on associated geographical locations.

10. The method of claim 8, wherein the chronological representation is displayed by the display device in a vertical orientation.

11. The method of claim 8, wherein the plurality of social network communications is displayed by the display device with an associated grouping confidence level.

12. The method of claim 8, further comprising deleting one of the identified social network communications from the plurality of social network communications in response to receiving a delete request.

13. The method of claim 8, further comprising outputting, to the display device, information about at least one identified respective social network communication from the plurality of social network communications in response to receiving a selection of a selectable link associated with the chronological representation.

14. The method of claim 8, wherein at least one social network in the plurality of different social networks is at least one of Facebook™, Google+™, Twitter™, LinkedIn™, YouTube™, Foursquare™, Yelp™, Expedia™, MySpace™, and Flickr™.

15. A computer program product comprising computer-readable program code to be executed by one or more processors when retrieved from a non-transitory computer-readable medium, the program code including instructions to:
accessing social network communications associated with a user of at least one social network;
identifying a plurality of social network communications based on each respective social network communication being related to a same associated attribute, the associated attribute including at least one of a name, a keyword, a calendar date, or a geographic location;
assigning a priority to each identified social network communication based on a corresponding number of social network references generated by social network account contacts; selecting a first identified communication from a first social network based on its assigned priority and a second identified communication from a second different social network based on its assigned priority;

generating a visual representation of the first and the second identified social network communications; and causing a chronological representation of the identified social network communications to be outputted to a display device, the chronological representation including the visual representation of the first and the second identified social network communications.

16. The computer program product of claim 15, wherein the chronological representation is displayed by the display device on a map based on associated geographical locations.

17. The computer program product of claim 15, wherein the chronological representation is displayed by the display device in a vertical orientation.

18. The computer program product of claim 15, wherein the plurality of social network communications is displayed by the display device with an associated grouping confidence level.

19. The computer program product of claim 15, further comprising deleting one of the identified social network communications from the plurality of social network communications in response to receiving a delete request.

20. The computer program product of claim 15, further comprising outputting, to the display device, information about at least one identified respective social network communication from the plurality of social network communications in response to receiving a selection of a selectable link associated with the chronological representation.

21. A system comprising:

a processor-based application, which when executed on a computer, will cause the processor to:

access social network communications associated with a user of at least one social network;

identify a plurality of social network communications based on each respective social network communication being related to a same associated attribute, the associated attribute including at least one of a name, a keyword, a calendar date, or a geographic location;

assign a priority to each identified social network communication based on a corresponding number of social network references generated by social network account contacts; select a first identified communication from a first social network based on its assigned priority and a second identified communication from a second different social network based on its assigned priority;

generate a visual representation of the first and the second identified social network communications; and cause a chronological representation of the identified social network communications to be outputted to a display device, the chronological representation including the visual representation of the first and the second identified social network communications.

* * * * *